US007670217B1

(12) United States Patent
Brodeur

(10) Patent No.: US 7,670,217 B1
(45) Date of Patent: Mar. 2, 2010

(54) WINDOW RAIN SHIELD VENTILATOR

(76) Inventor: Michael R. Brodeur, 98 White Oak Run, Westport, MA (US) 02790

( * ) Notice: Subject to any disclaimer, the term of this patent is extended or adjusted under 35 U.S.C. 154(b) by 356 days.

(21) Appl. No.: 11/895,043

(22) Filed: Aug. 23, 2007

(51) Int. Cl.
*E06B 7/03* (2006.01)
*F16D 1/11* (2006.01)
*F16D 1/00* (2006.01)

(52) U.S. Cl. ....................... 454/214; 454/220; 454/216; 403/408.1; 403/406.1

(58) Field of Classification Search ......... 454/214-216, 454/220
See application file for complete search history.

(56) References Cited

U.S. PATENT DOCUMENTS

| | | | | |
|---|---|---|---|---|
| 1,075,058 | A * | 10/1913 | Orth | 454/220 |
| 1,465,265 | A * | 8/1923 | Hamme | 160/102 |
| 1,465,722 | A * | 8/1923 | Thomas | 454/220 |
| 1,660,793 | A * | 2/1928 | Hodge | 454/220 |
| 1,719,980 | A * | 7/1929 | Imbruglia | 454/220 |
| 5,454,755 | A * | 10/1995 | Sweeny et al. | 454/220 |

* cited by examiner

*Primary Examiner*—Steve McAllister
*Assistant Examiner*—Helena Kosanovic
(74) *Attorney, Agent, or Firm*—William Nitkin

(57) ABSTRACT

A window rain shield ventilator for installation in an open window, such ventilator having slideably extending first and second ventilator shield members attached, respectively, to first and second flange members, each flange member having at least one rotatable engagement member to aid in retaining the ventilator in the window's sash channels.

4 Claims, 3 Drawing Sheets

WINDOW RAIN SHIELD VENTILATOR

BACKGROUND OF THE INVENTION

1. Field of the Invention

The device of this invention resides in the field of double-hung window ventilators and more particularly relates to a securely installed window ventilator that acts as a rain shield.

2. History of the Prior Art

The prior art has long appreciated that when the lower sash of a double-hung window is lifted and it is raining outdoors, wind can drive that rain directly into the room where the window is located. Window rain shield ventilators have been used to prevent rain from coming in an open window. Many of such window rain shield ventilators have been patented. For example, U.S. Pat. No. 1,914,728 to Plym teaches a ventilation bracket attached to the sides of a window frame extending inward and disposing a ventilator which extends upward from the window sill at an inwardly disposed angle to the window frame which will block rain from entering the room through the open window while at the same time allowing air circulation to occur freely therethrough. Many other rain shields have been taught in the prior art, such as U.S. Pat. No. 2,120,730 to Chemoski which teaches a similar inwardly extending shield member that is attached by end members to the window frame. U.S. Pat. No. 2,376,230 to Coffed teaches another embodiment of a sash ventilator. U.S. Pat. No. 2,460,760 to Mazza and U.S. Pat. No. 2,595,750 to Ferris teach an adjustable ventilator which can be attached in a non-permanently fixed installation to a window. Another embodiment of a window ventilator is seen in U.S. Pat. No. 2,701,515 to Rinker. U.S. Design patent D384,166 to Coats teaches a combined window ventilator and rain catcher that can be formed for insertion in one type of window which design allows for air circulation while still blocking rain from entering a room.

SUMMARY OF THE INVENTION

It is an object of this invention to provide a portable, slideably extendible and retractable, compact window rain shield ventilator that can be quickly, easily and securely installed below the lower sash of windows of a wide variety of sizes without the need for nails, screws or other permanent means of installation. The window rain shield ventilator of this invention is most useful when installed in double-hung windows, but it can also be used on other types of window frame environments.

The device of this invention utilizes a first and second elongated shield member which are adapted to slide, one against the other. These shield members are positioned at an angle, extending into a room, between the lower sash and the outer window sill, and they act to block rain from entering the room. Attached to the first and second shield members, respectively, are substantially triangular first and second flanges.

The novel features of the invention concern the several means of securely retaining the device in place when installed in an open window. The first and second flanges have window sash channel locking members thereon such that after the lower sash is raised and the slideably engaged first and second shield members are spread apart to match the width of the window opening, the channel locking members can be engaged into their respective window sash channels and affixed therein by turning interior knobs on each side flange to engage the wing portions of elongated members against the sides of the window sash channel of the sash rails to help hold the device in place. In a preferred embodiment these elongated members can be elongated S-shaped members. The shield members extend from a position at the inside portion of the stool, and each flange includes a protrusion which extends down behind the stool and rests upon the outer sill to help position the base of each flange securely in the open window. The device is further secured in place by the lowering of the lower window sash into first and second notches defined, respectively, in the tops of the first and second flanges which lowering puts downward pressure on the protrusions to help keep the device securely retained in place.

DESCRIPTION OF THE PREFERRED EMBODIMENT(S)

Figure 1:
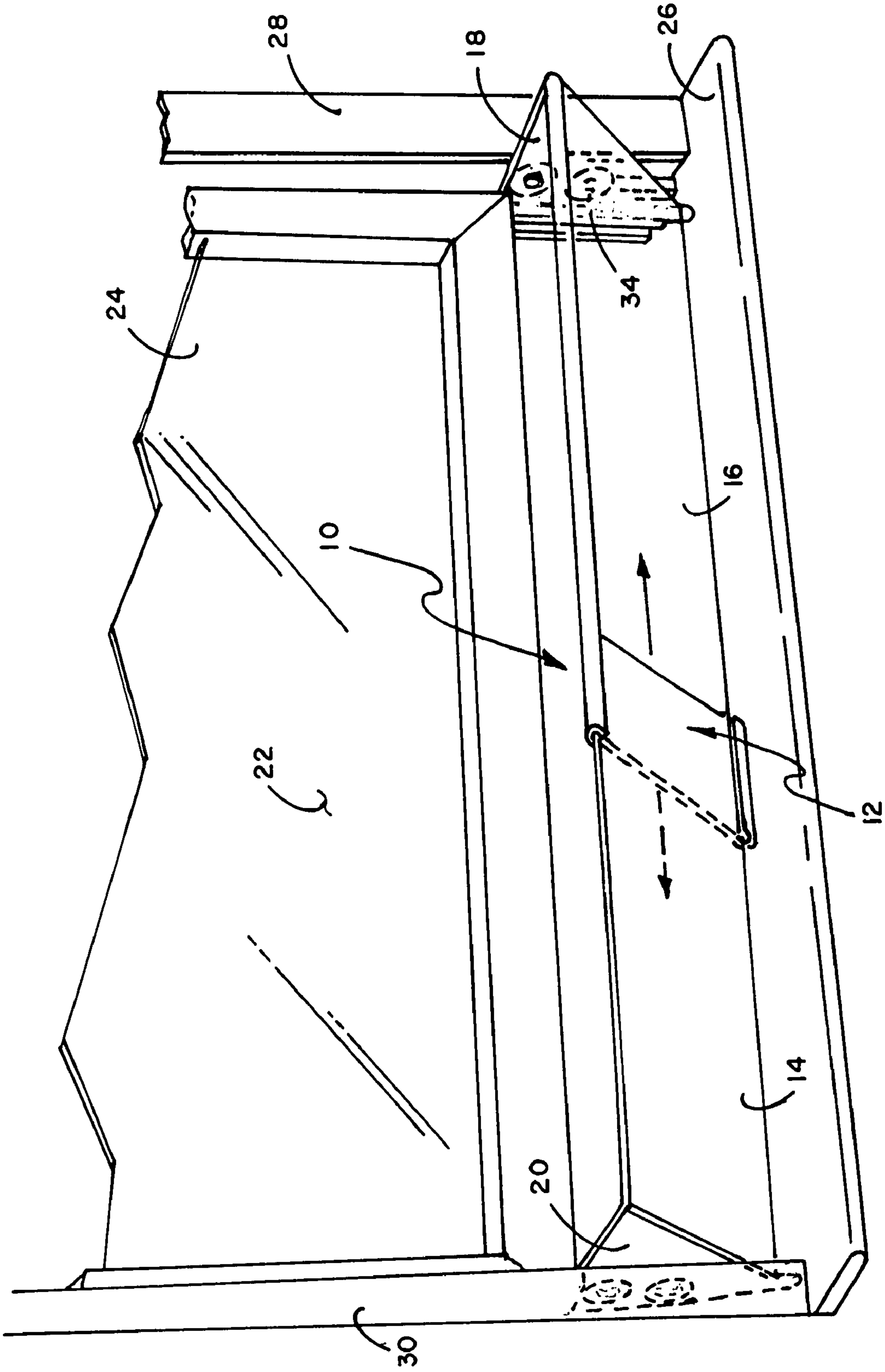
FIG. 1 illustrates a front perspective view of the Window Rain Shield Ventilator of this invention installed below the lower sash of a double-hung window.
Figure 2:
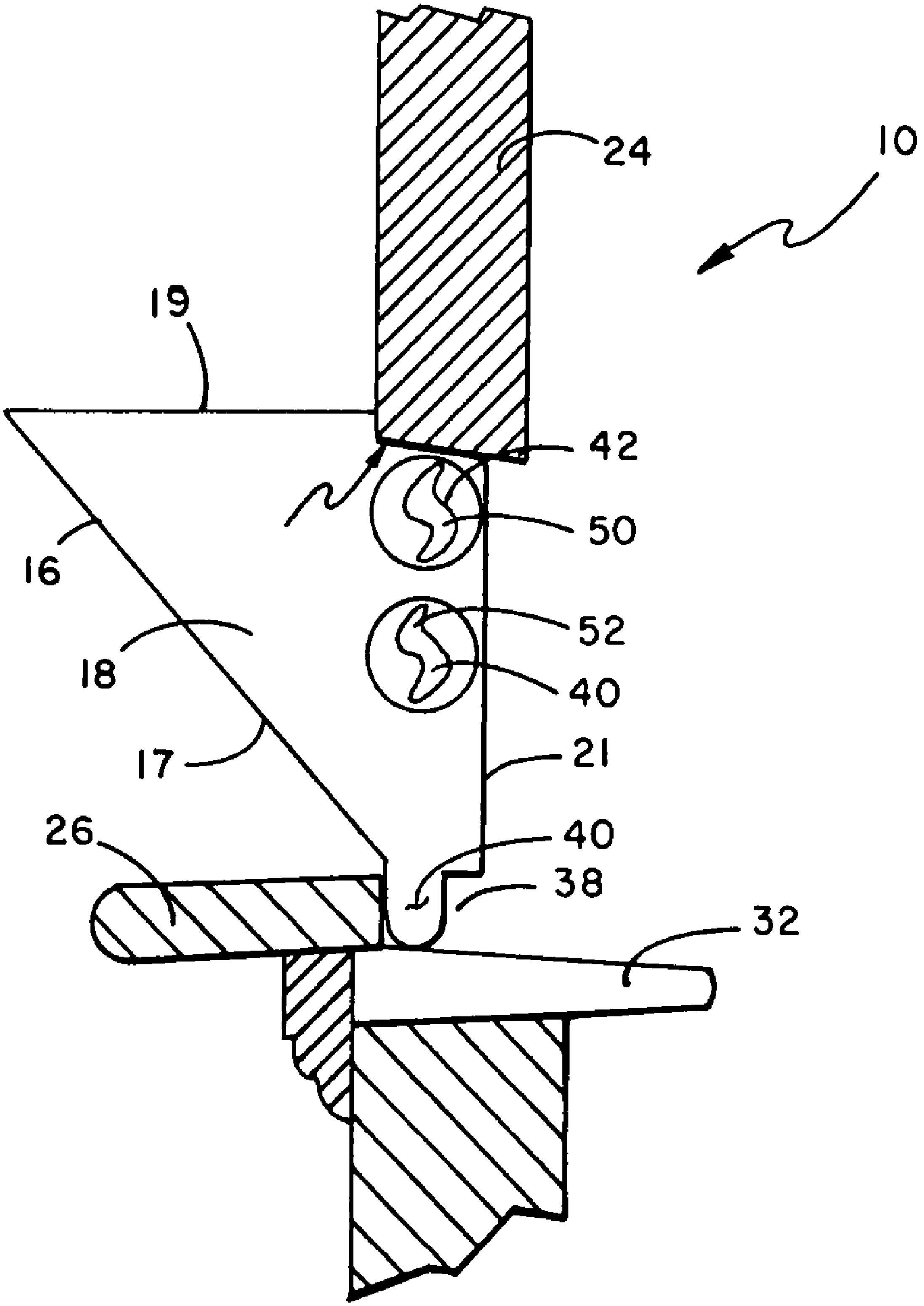
FIG. 2 illustrates a right side cutaway view through the bottom of the lower sash of the double hung window of FIG. 1, showing the device installed between the lower sash and the outer sill and showing the channel engagement members in their disengaged mode.
Figure 5:
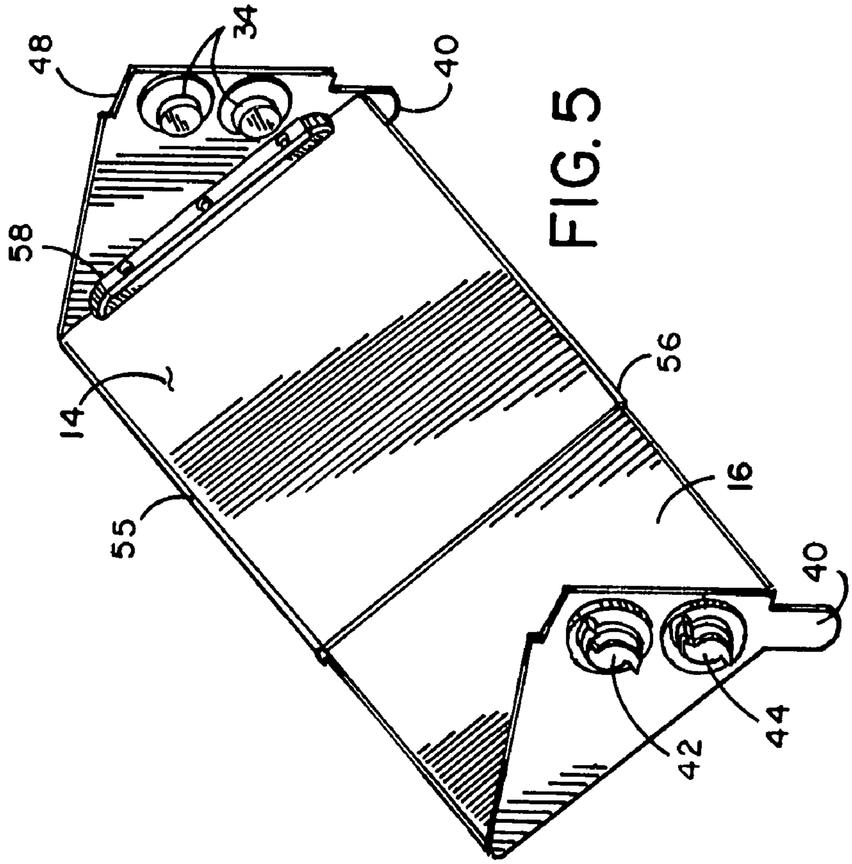
FIG. 5 illustrates a rear perspective view of the device removed from the window, showing the knobs and channel engagement members.
Figure 3:
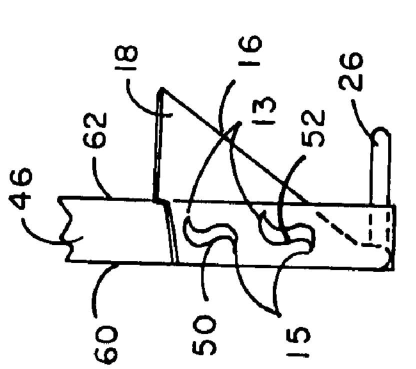
FIG. 3 illustrates a side view of the interior of the window sash channel, showing the flanges' channel engagement members in their disengaged mode.
Figure 4:
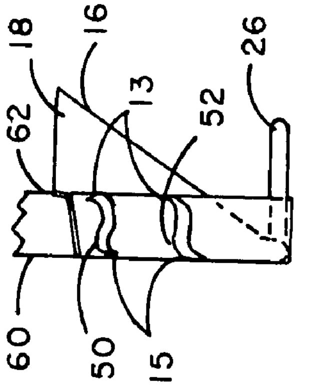
FIG. 4 illustrates the side view of FIG. 3, showing the flanges' channel engagement members in their engaged mode against the sides of the window sash channel.

FIG. 1 illustrates a front perspective view of Window Rain Shield Ventilator 10 of this invention installed between outer sill 32, as seen in FIG. 2, and lower sash 24 of an open window of the double-hung variety where lower sash 24 is seen raised above stool 26. The lower sash rides within first sash rail 30 and second sash rail 28 formed, respectively, within first and second window sash channels, one of which is illustrated in FIGS. 3 and 4 as window sash channel 46 which are well known in the prior art. Glass 22 of lower sash 24 is shown partially cutaway in FIG. 1. Device 10 of this invention has first ventilator shield 14 and second ventilator shield 16, each having first and second ends. First ventilator shield 14 and second ventilator shield 16 are slideably engaged to one another wherein second ventilator shield 16 has first and second channels 55 and 56, as seen in FIG. 5, defined therein, respectively, along its top and bottom for slideable engagement of first ventilator shield 14 therein, allowing first ventilator shield 14 and second ventilator shield 16 to slide back and forth, as seen by the arrows, thereby making the structure adapted, when extended, to fit windows of many widths as well as very compact when slid together and when removed for storage. When the device is installed in an open window, as seen in FIGS. 1 and 2, first and second ventilator shields 14 and 16 can be slid, one inside the other until their first ends have extended to fit between first and second sash rails 30 and 28. First ventilator shield 14 and second ventilator shield 16 each have attached, respectively, from their first ends first and second flanges 20 and 18 with each having a protruding member, as seen in FIG. 2, being protrusion 40 which extends down behind stool 26 and which rests upon sill 32 to help engage each side flange securely in the open window. Each flange can be being substantially triangular in shape with each having a top and a bottom. The three sides of each flange member consist of a first side 17 attached to the first end of each ventilator shield member. When the device is in use, first side 17 extends at an upward angle into the room, second side 19 is disposed at the top of each flange member, and third side 21 is disposed vertically between the lower window sash and the outer sill. A notch 48 is defined in each side flange at its top for receipt of the bottom of lower sash 24 therein to help secure the device in position. In FIG. 2 notch 48 is shown in second flange 18, such notch 48 being cut at an angle to match the angular bottom of lower sash 24. Also seen in FIG. 2 are upper first channel engagement member 42 and lower second channel engagement member 40. Although two channel engagement members are illustrated as part of each side flange, in some instances one or more than two channel engagement member can be utilized. Each channel engagement member is mounted on a shaft that is attached to inner knob 34, as seen in FIGS. 1 and 5, such that by rotating knob 34, S-shaped rotatable member can be rotated from a first vertically disposed disengaged position, as seen in FIG. 3, that does not contact the sides of window sash channel 46, to a second horizontally disposed position, as seen in FIG. 4, where first and second wings 13 and 15 of S-shaped members 50 and 52 have been rotated approximately 90 degrees outward within window sash channel 46 of the sash rail or whatever rotation is needed to then contact and retain the device in position by frictional contact with the sides of the sash rail. As seen in FIG. 5, a serrated edge of knob 34 can engage into a protrusion to prevent rotation of the knobs unless such rotation is deliberately down by hand. In the above-described manner the Window Rain Shield Ventilator of this invention can be installed and held in place securely in open windows of different sizes in a very convenient manner. When the device is no longer needed, the inner knobs 34 on the first and second side flanges can be rotated inward to position their respective first and second S-shaped members 50 and 52 in a vertically disposed position, releasing their contact with the sides of the window sash rails, and the lower window sash can be raised and first ventilator shield 14 and second ventilator shield 16 can be slid together to allow device 10 to be removed from the open window and stored in a compact state for later use. To strengthen the connection between the side flanges, such as the attachment of first flange 20 to first ventilator shield 14, a reinforcement member 58, as seen in FIG. 5, can be attached to first flange 20 by glue or other means of attachment and then attached to the inside of first ventilator shield 14 by screws or by adhesive means.

Although the present invention has been described with reference to particular embodiments, it will be apparent to those skilled in the art that variations and modifications can be substituted therefor without departing from the principles and spirit of the invention.

I claim:

1. A window rain shield ventilator for installation in an open window in a room for deflecting rain from entering said room, said window encompassing an outer sill, an inner stool, a lower sash having an angled bottom, first and second window sash channels having sides disposed, respectively, in first and second sash rails, comprising:

a first ventilator shield member having a first end, a second end, a top, a bottom and a length;

a second ventilator shield member having a first end, a second end, a top, a bottom, a length and first and second channels defined, respectively, along its top and its bottom, said channels for receipt, respectively, of the said top and said bottom of said second end of said first ventilator shield member, said first ventilator shield member adapted to slide within said first and second channels of said second ventilator shield member, said first and second ventilator shield members adapted for said first ends of each to extend over a variety of widths and allowing said first ends to extend to said first and second sash channels of said window when said first and second ventilator shield members are installed in said open window;

first and second flange members disposed, respectively, at said first ends of said first and second ventilator shield members, said first and second flange members each being substantially triangular in shape having three sides and each flange member having a top, a bottom, an inner side, and an outer side, said three sides of each of said flange members comprising a first side attached to said first end of each ventilator shield member, said first side when said window rain shield ventilator is installed in an open window disposed at an angle extending upwards into said room, said first side having a bottom, a second side disposed at said top of each of said flange members, and a third side of each flange member disposed between said first side and said second side, said third side disposed vertically between said window sash and said outer sill when said window rain shield ventilator is installed in an open window;

a first and second notch defined, respectively, in the junctions of said second and third sides of said first and second flange members, each of said notches having a vertical side and a downwardly angled base, each notch formed when installed in an open window for receipt of said angled bottom of said lower sash, said lower sash having a mating relationship with said downwardly angled base of said first and second notches;

first and second protrusions extending vertically downward from said bottom of said first sides, respectively, of each of said first and second flange members, said first and second protrusions when installed in an open window for positioning behind said stool and above said outer sill of said window; and first and second engagement means rotatably disposed, respectively, on each of said third sides, respectively, of said first and second side flange members, said first and second engagement means for engaging within said first and second window sash channels of said first and second sash rails.

2. The device of claim 1 wherein said first and second engagement means each comprise at least one rotatable elongated member disposed on each outer side of said first and second flange members, each of said elongated members rotatable by means of a knob disposed on said inner side of said first and second side flange members in the vicinity of said third side, said elongated member having first and second wing portions extending therefrom, said elongated member rotatable from a vertically disposed first position when said device is installed in an open window wherein said first and second wing portions do not extend to and do not contact said sides of said first and second window sash channels to a second position when said knobs are rotated, allowing said first and second wing portions of each of said elongated members to make contact and engage against said sides of said first and second window sash channels of said window.

3. The device of claim 2 wherein said elongated members are elongated S-shaped members.

4. The device of claim 3 wherein there are two rotatable elongated S-shaped members disposed on each outer side of said first and second flange members, each rotatable by its respective knob.

* * * * *